(12) United States Patent
Dewald (10) Patent No.: US 6,231,190 B1
(45) Date of Patent: May 15, 2001

(54) COLOR CORRECTION FILTER FOR DISPLAYS

(75) Inventor: D. Scott Dewald, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/338,166

(22) Filed: Jun. 22, 1999

Related U.S. Application Data (60) Provisional application No. 60/090,219, filed on Jun. 22, 1998.

(51) Int. Cl.[7] .................................................. G03B 21/14
(52) U.S. Cl. .................................. 353/31; 353/33; 353/84
(58) Field of Search .................................... 353/84, 81, 31, 353/33, 34, 37; 359/589, 590, 634, 885; 349/5, 8, 9

(56) References Cited

U.S. PATENT DOCUMENTS

| 5,452,024 | | 9/1995 | Sampsell | 348/755 |
| 5,743,610 | * | 4/1998 | Yajima et al. | 353/81 |
| 5,934,778 | * | 8/1999 | Shioya | 353/84 |
| 5,986,815 | * | 11/1999 | Bryars | 359/634 |

* cited by examiner

*Primary Examiner*—William Dowling
(74) *Attorney, Agent, or Firm*—Charles A. Brill; Wade James Brady, III; Frederick J. Telecky, Jr.

(57) ABSTRACT

A method of and system for improving the saturation of the primary colors in a display system. A color correction filter (218) removes unwanted wavelengths from a beam of light. A color splitter (228) separates the beam of light into at least three primary color beams of light. The primary color beams of light are selectively modulated by spatial light modulators (220, 222, 224) before passing through a projection lens (104) which focuses the beams of light onto an image plane.

22 Claims, 6 Drawing Sheets

COLOR CORRECTION FILTER FOR DISPLAYS

This application claims priority under 35 USC § 119(e)(1) of provisional application number 60/090,219 filed Jun. 22, 1998.

CROSS-REFERENCE TO RELATED INVENTIONS

The following patents and/or commonly assigned patent applications are hereby incorporated herein by reference:

| Patent No. | Filing Date | Issue Date | Title |
| --- | --- | --- | --- |
| 09/311,011 | May 13, 1999 | | Projector for Digital Cinema |
| 5,452,024 | Nov. 1, 1993 | Sept. 19, 1995 | DMD Display System |

FIELD OF THE INVENTION

This invention relates to the field of display systems, more particularly to projection displays, in particular to projection displays using a color-splitting mechanism.

BACKGROUND OF THE INVENTION

The market for quality projection displays is growing rapidly. At least part of this market growth is a result of the greatly improved performance of modern display systems. The increase in performance is evident in a number of areas such as increased resolution, reduced weight, greatly improved image brightness, and the introduction of true digital projection. In spite of these improvements, there is still a need in the display market for improved image quality.

SUMMARY OF THE INVENTION

Objects and advantages will be obvious, and will in part appear hereinafter and will be accomplished by the present invention, which provides a method and system for improving the color gamut of display systems. According to one embodiment of the disclosed invention, a display system is provided. The display system comprises a light source, a color splitter, at least three modulators, and at least one color correction filter. The light source provides a beam of light along a white light path. The color splitter separates the beam of light into at least three primary color light beams. The at least three primary color light beams are them selectively modulated by the at least three spatial light modulators. According to one embodiment, the color splitter is a color splitting prism assembly. According to another embodiment, the color splitter is a set of dichroic mirrors. According to one embodiment, the color splitter separates the incident beam of light into a red, green, and blue beam with the color correction filter removing portions of the yellow and blue-green light.

According to another embodiment of the disclosed invention, a method of creating an image is disclosed. The method comprises the steps of providing a beam of light, filtering the beam of light into at least three primary color light beams each comprised of light in a band of wavelengths and traveling along a separate light path, filtering the beam of light to remove portions of the beam having wavelengths between the bands of wavelengths comprising the at least three primary color light beams, selectively modulating each of the at least three primary color light beams, and focusing the at least three selectively modulated primary color light beams onto an image plane.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new method and system of improving the color spectrum of a display have been developed. The improvement to the color spectrum is achieved by providing a color correction filter in the path of the incident beam of light. The added color correction filter removes light from the bands between the display's primary colors. Specifically, the color correction filter in an RGB display removes the majority of the yellow light and a fraction of the blue-green light. These colors cause desaturation of the primary red, green, and blue colors. Therefore, removal of these colors increases the saturation of the primary colors produced by the display system. The filter disclosed is optimized for Xenon lamp systems.

Figure 1:
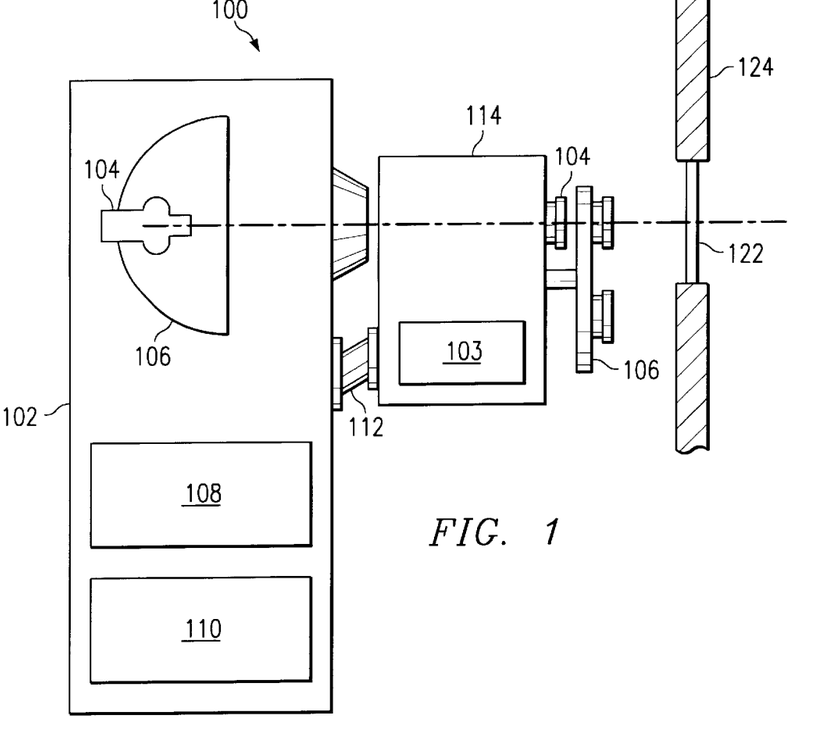
FIG. 1 is a schematic view of a lamp console and a digital projector system according to one embodiment of the present invention.

FIG. 1 is a stylized side view of a theater projection system 100. In FIG. 1, the theater projection system 100 consists of two main portions, a lamp console 102 and an attached projector 114. The lamp console 102 contains a xenon arc lamp 104 mounted in a cold reflector 106. The lamp console also houses the power supply 108 for the xenon arc lamp 104. When operating, the xenon lamp 104 produces a lot of heat. To keep the xenon arc lamp 104 as cool as possible, and thus extend the operating life of the xenon arc lamp 104, a cooling system 110 is installed in the lamp console 102. Typically the cooling system 110 is comprised of a fan and appropriate ductwork.

The lamp console 102 produces a high-intensity beam of light which exits the lamp console 102 through an aperture in the side of the lamp console 102. Projector 114 receives the light exiting the console 102. Projector 114 modulates the beam of light to produce a full-color, image-bearing beam of light. The modulated light is then focused on an image plane or viewing screen by the projector's primary lens 120 after passing through a window 122 in the projection room's wall 124. Although FIG. 1 depicts a theater projection system, the invention disclosed herein is applicable to all image display systems which use color splitters to separate primary color components from a beam of white light.

Figure 2:
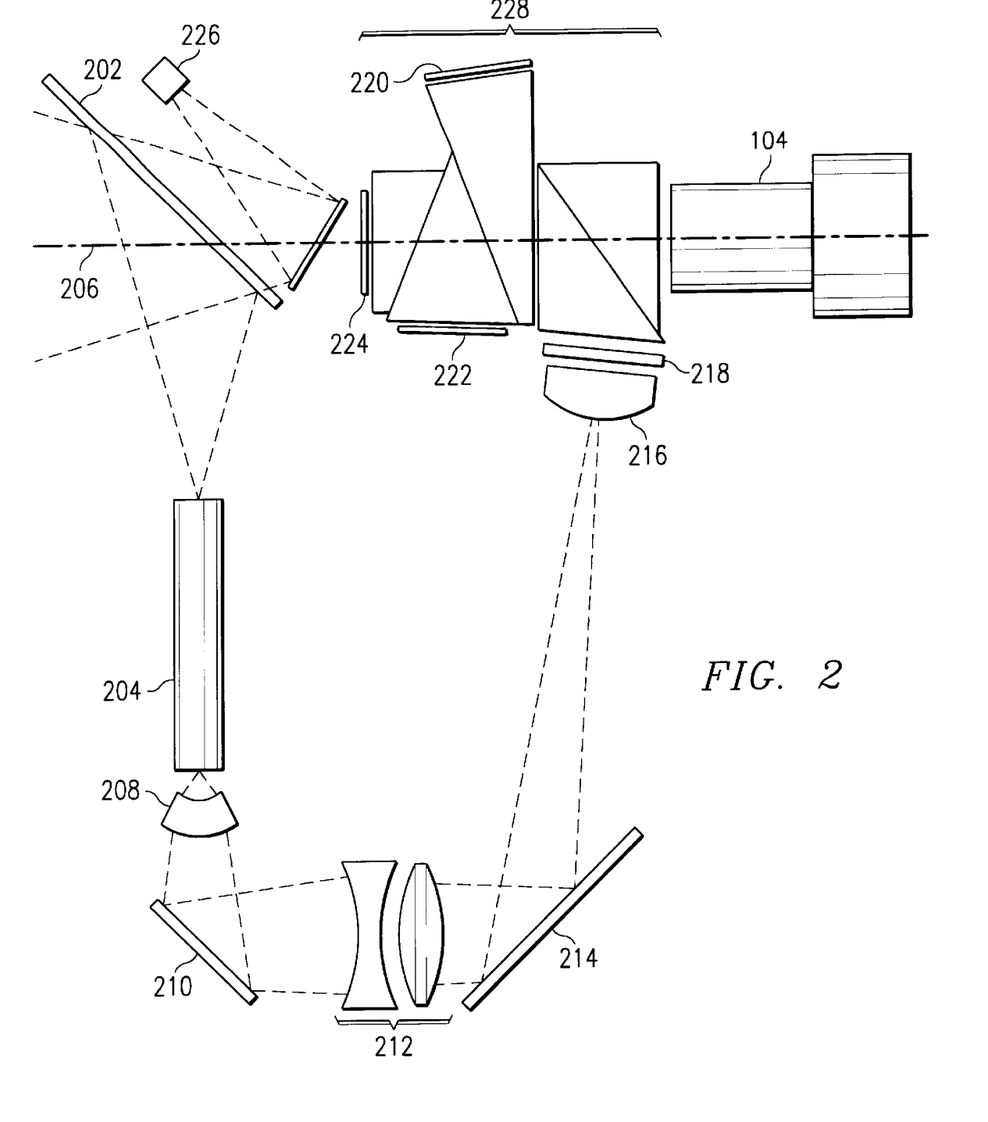
FIG. 2 is a view of the optical path of the digital projector system of FIG. 1 showing a color correction filter.

FIG. 2 is a schematic view of the components in the optical path of projector 114 showing the relative locations of the major optical components. The optical path shown in FIG. 2 is for purposes of illustration only, and not for purposes of limitation. As shown in FIG. 2, light entering the projector 114 from the lamp console 102 strikes a cold mirror 202. The cold mirror 202 allows infrared light to pass while reflecting visible light toward an integrating rod 204. Light passing through the cold mirror 202 is reflected to an optional focus sensor 222. The optional focus sensor 226 allows the projectionist to peak the light output of the projector while the display screen is still dark.

The cold mirror 202 not only folds the optical path to reduce the physical size of the projector 114 along the primary optical axis 206, it also allows the integrator rod 204 to be positioned vertically. By mounting the integrator rod 204 vertically, the integrator rod 204 will not have a tendency to collect dust particles on the ends of the integrator rod 204. Dust particles on the ends of the integrator rod 204 lower the efficiency of the projector 114 and are visible on the image projection screen. While gravity prevents dust particles from settling on the lower exit end of a vertical integrator rod 204, the extremely high temperature present at the entrance of the integrator rod 204 prevents dust from accumulating on the upper entrance end of the integrator rod 204.

The visible light reflected by cold mirror 202 enters the end of integrating rod 204. The integrating rod 204 is a glass prism designed to internally reflect fight entering the integrating rod 204. The internal reflections tend to blend portions of the entering light beam and produce a homogeneous light beam exiting the far end of the integrator rod 204. In addition to homogenizing the light beam, the integrating rod 204 also gives the light beam a rectangular cross-section which allows the beam to be efficiently focused onto the rectangular spatial light modulators.

After exiting the integrating rod 204, the light beam passes through lens 208 before striking another fold mirror 210. The light beam then passes through a relay lens group 212 and is reflected by yet another fold mirror toward a collector lens 216, a color correction filter 218, and a prism assembly 228. As described below, the prism assembly 228 separates the beam of white light into three primary color light beams and directs each of the primary color light beams to a unique spatial light modulator. After being modulated by the three spatial light modulators 220, the modulated light beams are recombined as they pass back through the prism assembly 218 and the recombined modulated light beam enters the primary projection lens 104 which focuses the modulated light beam on the image screen. According to the embodiment shown in FIG. 2, the primary projection lens is positioned on the same optical axis 206 as the beam of light from the lamp console 102.

Figure 3:
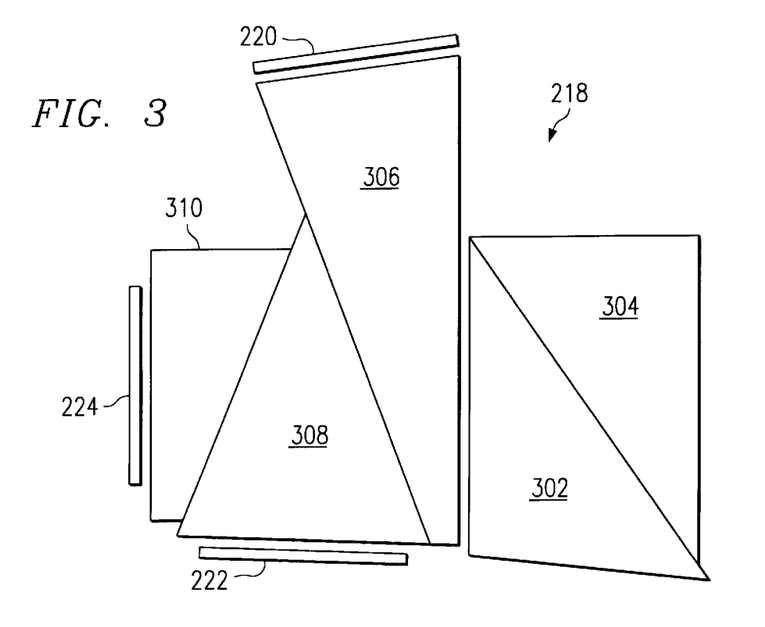
FIG. 3 is a side view of the TIR prism group and color splitter prism group from FIG. 2.

The prism assembly 228, shown in more detail in FIG. 3, typically is comprised of two groups of prisms which direct the light to three digital spatial light modulators. The first prism group encountered by the incident beam of light is the TIR prism group. The TIR prism group acts as a directional beam splitter to provide physical separation between the light beams incident on and reflected by the reflective spatial light modulators. Because a typical DMD spatial light modulator only separates the incident and reflected light beams by about 20°, it is advantageous to fold one of the optical paths to separate the incident and reflected light beams and to prevent physical interference between the illumination and projection optics. The TIR prism group, by folding only the illumination light path, provides about 90° of separation between the illumination and projection paths.

The TIR prism group is comprised of a TIR prism 302 and a compensation prism 304. Light entering the TIR prism 302 from lens 304 is internally reflected by the interface between the TIR prism 302 and the compensation prism 304. The light exits the TIR prism group and enters the color splitter prism group where it is separated and modulated. After being modulated and recombined, the light beam reenters the TIR prism group from the color splitter prism group. The modulated light strikes the interface between the TIR prism 302 and the compensation prism 304 at an angle at which the light passes through the interface to the compensation prism 304 rather than reflecting at the interface. The compensation prism 302 equalizes the optical path length for all portions of the light beam. The modulated light continues through the compensation prism 302 and enters the primary projection lens 104.

The color splitter prism group is comprised of three prisms 306, 308, 310, and two dichroic filters deposited on prism faces. White light entering the color splitter prism group is split into three component color light beams by selective reflection using the dichroic filters. For example, as the white light passes through a first color splitter prism 306, a first color component is reflected by a dichroic filter at the interface between the first color splitter prism 306 and a second color splitter prism 308. The reflected first color component light beam travels through the first color splitter prism 306 to a first spatial light modulator 220. The first spatial light modulator 220 selectively reflects portions of the first color component light beam to form a first single color image bearing light beam.

The two color components of the white light beam which were not reflected by the first dichroic filter cross the interface between the first color splitter prism 306 and the second color splitter prism 308, and pass through the second color splitter prism 308. A second dichroic filter at the interface between the second color splitter prism 308 and a third color splitter prism 310 reflects a second single color component light beam through the second color splitter prism 308 to a second spatial light modulator 222. The second spatial light modulator 222 selectively reflects portions of the second color component light beam to form a second single color image bearing light beam.

The remaining portion of the white light beam passes through the third color splitter prism 310 to the third spatial light modulator 224. The third spatial light modulator 224 selectively reflects portions of the third color component light beam to form a third single color image bearing light beam.

After the three single component light beams are modulated by the spatial light modulators, they retrace their paths through the color splitter prism group where they are recombined, and reenter the TIR prism group. As mentioned above, they pass through the TIR prism group and enter the primary projection lens 104 which focuses the image-bearing beam of light onto a screen.

The dichroic filters formed on two of the prisms in the color splitter prism group separate light by selectively reflecting or transmitting certain wavelengths of light. Light reflected by each of the two coated prisms is selectively modulated by the spatial light modulator associated with that prism, while light transmitted by all three prisms is used by the third spatial light modulator. Thus, all wavelengths of light entering the color splitting prism assembly are modulated by at least one of the spatial light modulators before being projected toward the projection screen.

Figure 4:
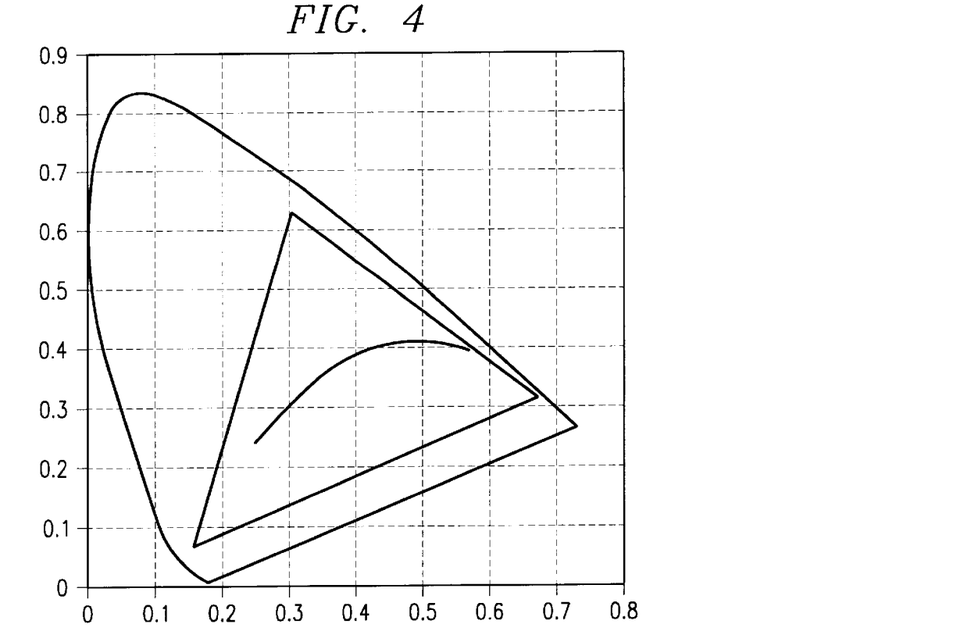
FIG. 4 is a CIE chromaticity diagram of a display system using only a color splitting prism assembly and no color correction filter.

The primary colors that a projector is capable of producing are determined by the characteristics of the color separating coatings in the color splitting prism as well as the spectrum of the lamp. FIG. 4 is a CIE chromaticity diagram of a typical display system using only the two dichroic filters in a color splitting prism assembly and a xenon lamp. While the color gamut of FIG. 4 provides high-quality images, the images are improved by the insertion of a carefully selected color correction filter 218 inserted into the optical path of the display.

Figure 5:
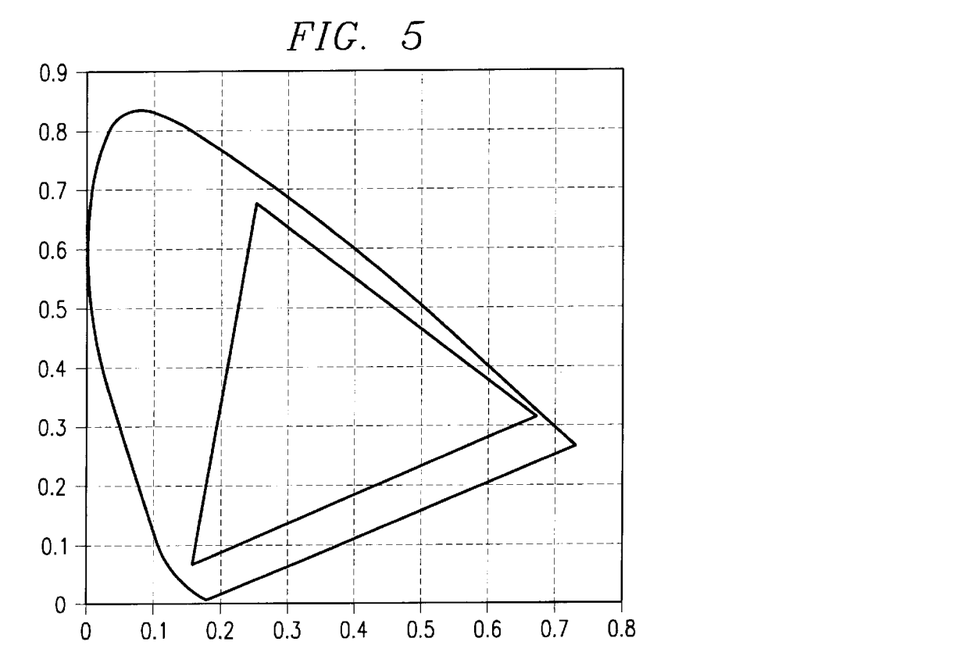
FIG. 5 is a CIE chromaticity diagram of the system represented in FIG. 4 showing the improvement to the display color spectrum provided by a color correction filter.

FIG. 5 is a CIE chromaticity diagram of the display system after the color correction filter 218 has been added to the light path. As shown by the differences between FIGS. 4 and 5, the color correction filter 218 greatly increases the color saturation of the green color component. The red color component is slightly changed while the blue component is not significantly affected. These changes to the saturation level of the primary colors enable the use of standard display prisms in electronic cinema applications.

The addition of the color correction filter not only provides the purer primary colors necessary for electronic cinema, it also reduces the sensitivity of the color gamut to variations in the color splitting prism coatings. Thus, the addition of the color correction filter improves the image quality as well as reducing unit-to-unit variations between projectors. The reduction in sensitivity to the variations in the color splitting prisms is a significant advantage since tightly controlling the dichroic filters in the color splitting prisms significantly raises the cost of the color splitting prism assembly.

Figure 6:
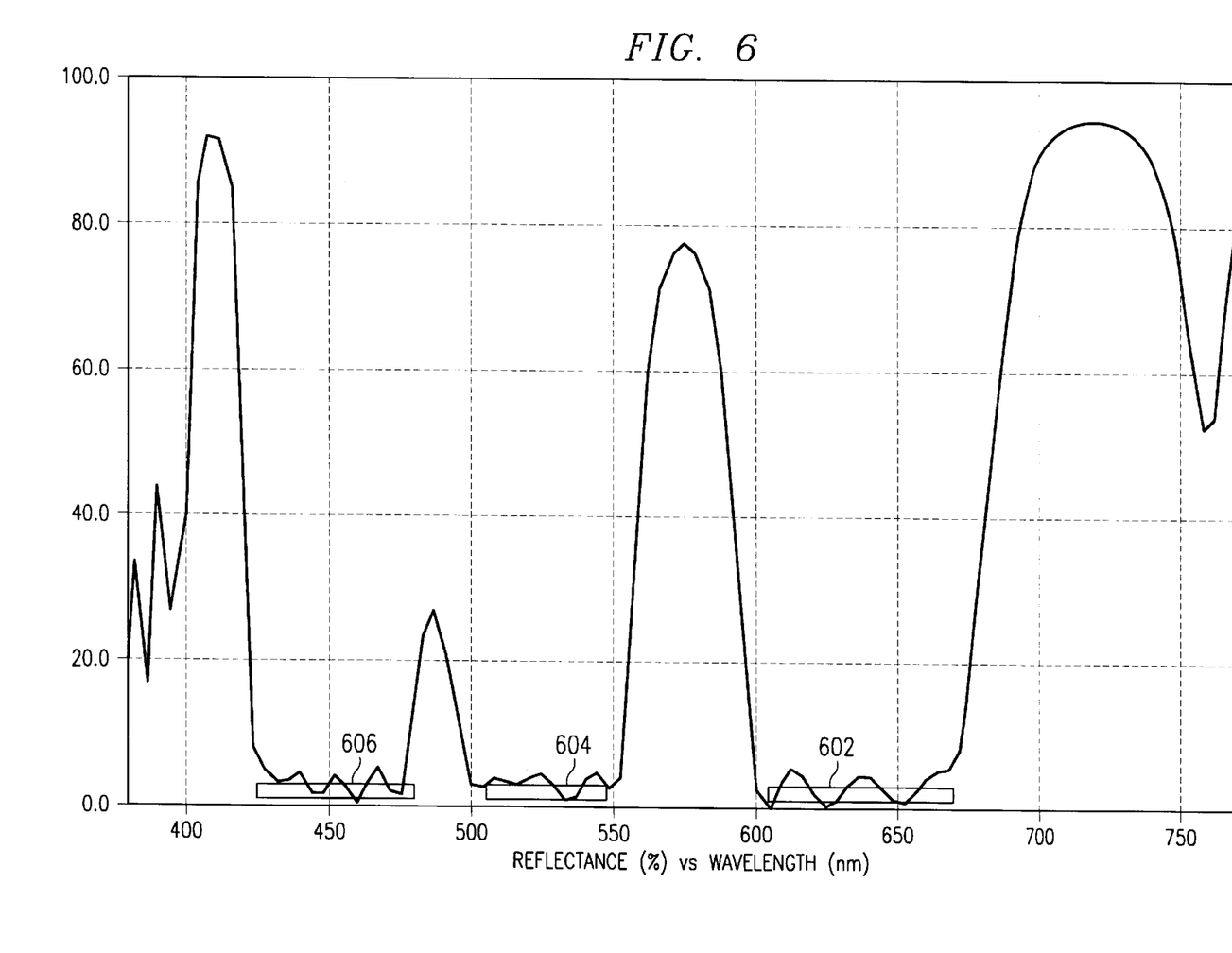
FIG. 6 is a plot of the response of the typical color correction filter of FIG. 2.

FIG. 6 is a plot of the reflectance characteristics of a typical color correction filter 218. As shown by the plot of FIG. 6, the majority of the yellow light between the desired red 602 and green 604 bands is reflected by the color correction filter 218. Additionally, a fraction of the blue-green light is also reflected by the color correction filter 218.

Figure 9:
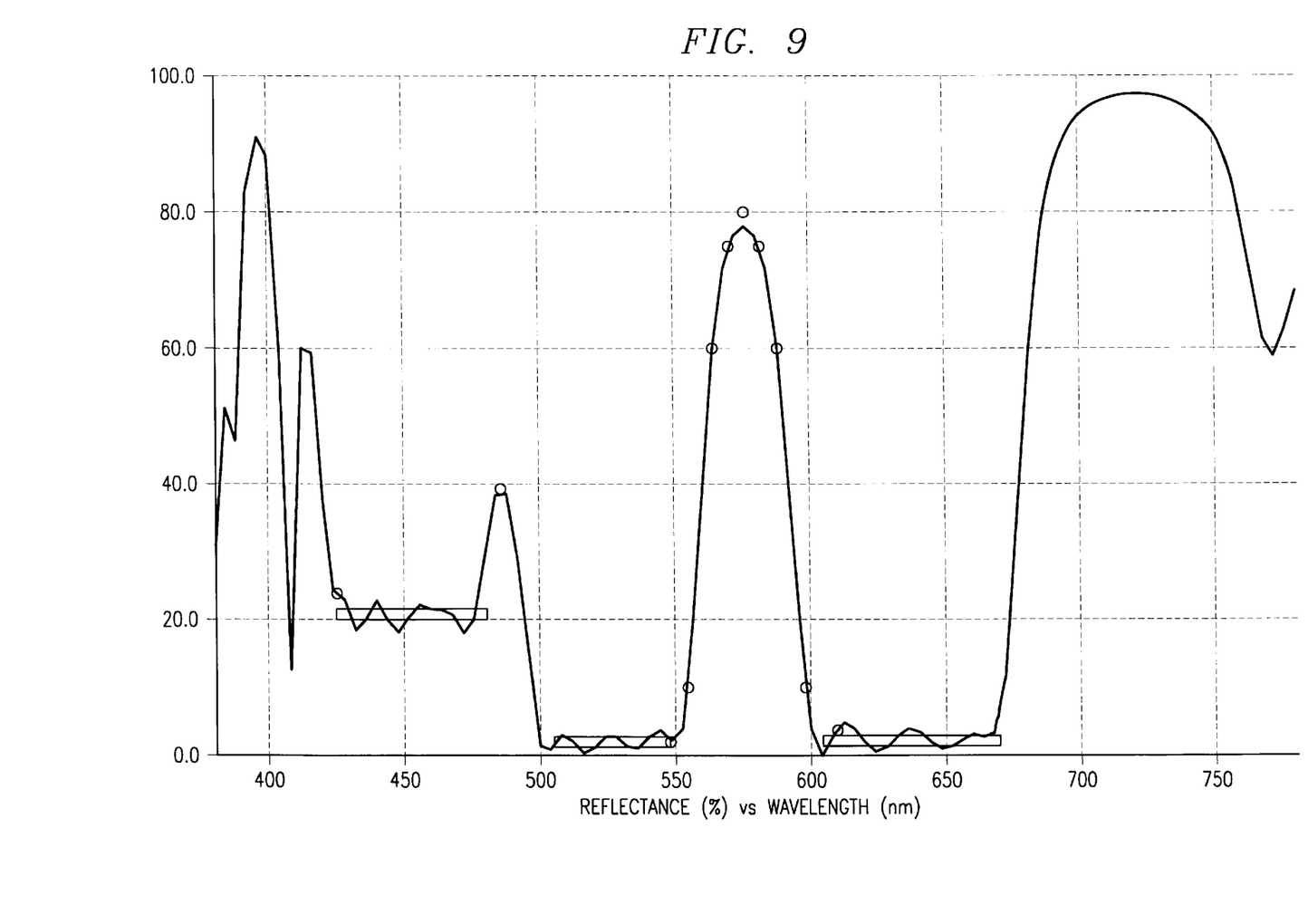
FIG. 9 is a plot of the response of an alternate color correction filter of FIG. 2.

The filter represented by FIG. 6 can provide a bluish tint to the white point of a projector using the color filter. Specifically, when applied to a 6000° K projector, the white point shifts to 7150° K. While the large amount of blue light can cause the projected images to look brighter and whiter, it reduces the color purity and can create secondary color correction errors. An alternate filter response is shown in FIG. 9. The filter of FIG. 9 has a 21% reflectance in the blue light range (430–480 nm). When applied to a 6000° K projector spectrum, the filter of FIG. 9 shifts the white point less than 50° K. In addition, the coating design of FIG. 9 is more forgiving of manufacturing tolerances than the filter of FIG. 6.

Figure 7:
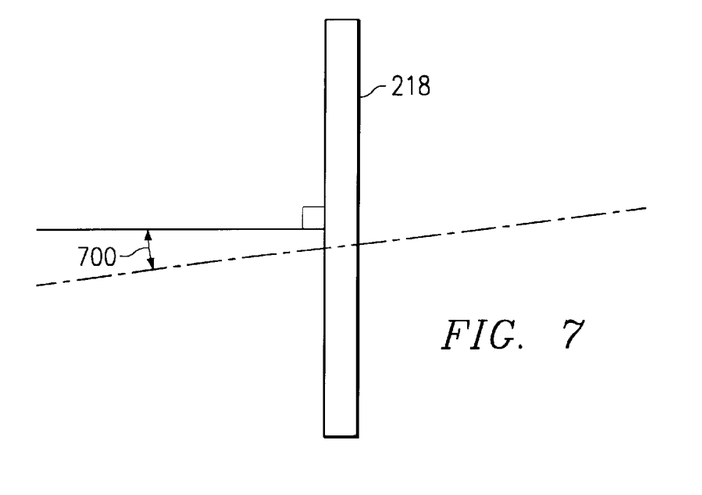
FIG. 7 is a side view of the color correction filter of FIG. 2 showing the alignment between the color correction filter and the light path.

Color correction filter 218 is preferably a dichroic filter. A dichroic color correction filter 218 should be placed in near collimated light at an angle of incidence 700, shown in FIG. 7, of about 8 degrees. Manufacturing tolerances in dichroic color correction filters 218 are compensated for by changing the angle of incident from 0 to 12 degrees. Changing the angle of incidence from 0 to 12 degrees shifts the spectral response of the dichroic filter +/−3 nm compared to the response at the nominal 8 degree angle of incidence.

Although FIG. 2 shows the color correction filter positioned in the light path immediately prior to the TIR prism assembly, the color correction filter 218 can be located at other points in the light path. Ideally, the color correction filter is placed in near collimated light prior to the TIR and color correction prisms. Placing the color correction filter between the prism assemblies and the projection lens is not preferred since this position would increase the back focal length of the projection lens 104.

Placing the color correction filter between the prism assemblies and the projection lens would also increase the thermal load of the prism assemblies. Since a small, but not insignificant portion of the light passing through the prism assemblies is absorbed, the prism assemblies tend to heat during the operation of the projector. As the prisms get hot, they expand and shift relative to each other. This expansion and shifting reduces the color convergence of the projector system. Conversely, the addition of the color correction filter prior to the prism assemblies reduces the light passing through the prisms and therefore improves the color convergence by reducing the heating of the prism.

In addition to absorbing some of the light, the prism assemblies tend to scatter a small portion of the light passing through them. By placing the color correction filter ahead of the prism assemblies in the light path the yellow and blue-green light is removed from the light path before entering the prism assemblies. This reduces the amount of light scattered by the prism assemblies and raises the contrast of the images produced by the display system.

Figure 8:
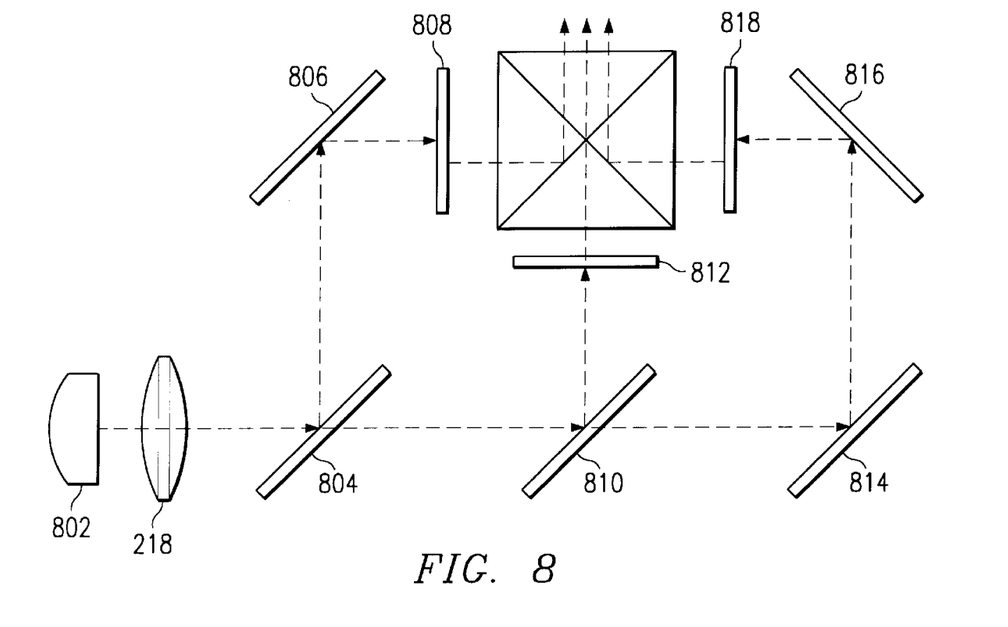
FIG. 8 is a view of the optical path of a projector system having a color correction filter and using transmissive light modulators.

Up to this point, the invention has been discussed using examples of a reflective modulator display system, FIG. 8 shows the use of a color correction filter 218 in a display system using transmissive spatial light modulators. In FIG. 8, a light source 802 produces a beam of light which is projected through the color correction filter 218. After passing through the color correction filter 218, the beam of light strikes a first dichroic mirror 804 which reflects a first primary color portion of the beam of light. The first primary color portion of the beam of light is reflected by mirror 806 and passes through a first transmissive spatial light modulator 808.

A portion of the light passing through the first dichroic mirror 804 is reflected by the second dichroic mirror 810 and passes through a second transmissive spatial light modulator 812. The remainder of the light is reflected by mirrors 814 and 816 prior to passing through a third transmissive spatial light modulator 818. After passing through the three transmissive spatial light modulators, the light is recombined by prism block 820. Prism block 820 typically is four prisms having dichroic filters deposited on the surfaces to recombine the light from each of the transmissive spatial light modulators.

Although the invention disclosed herein has been discussed in terms of a display system having a separate additional color correction filter, it should be understood that other alternative embodiments are possible. For example, it may be possible in some systems to apply the dichroic coatings forming the color correction filter to one of the other elements in the light path. For example, one of the fold mirrors, lenses, the integrating rod or the face of the TIR prism in FIG. 2 could be coated to operate as a color correction filter. As mentioned above, however, the color correction filter operates best when exposed to collimated, or nearly collimated, light. Therefore many of the surfaces in FIG. 2 are not suitable.

Additionally, although the invention disclosed herein has been discussed in terms of a 16 display system having a dichroic color correction filter, alternative embodiments utilize absorptive filters in place of the dichroic color correction filter of FIG. 2. Absorptive filters are generally less expensive, but have the disadvantage of being less efficient which causes them to heat more during operation. Furthermore, alternative embodiments use two or more color correction filters in place of the single color correction filter of FIG. 2. For example, the color correction filter of FIG. 2 is replaced by two color correction filters, one rejecting the yellow light and the other rejecting the blue-green light. The two dichroic filters may also be deposited on opposite sides of the same glass element.

Thus, although there has been disclosed to this point a particular embodiment for a method and system for color correcting display systems, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A display system comprising:
   a light source for providing a beam of light along a white light path;
   a color splitter on said white light path for separating said beam of light into at least three primary color light beams, each of said at least three primary color light beams comprised of light in a band of wavelengths and traveling along a separate light path;
   three light modulators, each of said three light modulators disposed on one of said separate light paths for said three primary color light beams; and
   at least one color correction filter on said white light path, said color correction filter for removing a portion of light having a wavelength between said three bands of wavelengths.

2. The display system of claim 1, wherein said color splitter is a color splitting prism assembly.

3. The display system of claim 1, wherein said color splitter is a series of dichroic mirrors.

4. The display system of claim 1, wherein said color splitter separates incident light into red, green, and blue primary color light beams.

5. The display system of claim 1, wherein said at least one color correction filter blocks yellow and blue-green light.

6. The display system of claim 1, wherein said at least one color correction filter is angle-tuned to reduce the effect of manufacturing tolerances.

7. The display system of claim 1, wherein said at least one color correction filter is angle-tuned to alter the pass-band characteristics of the filter.

8. A method of creating an image, said method comprising:
   providing a beam of light;
   separating said beam of light into at least three primary color light beams each comprised of light in a band of wavelengths and traveling along a separate light path;
   filtering said beam of light to remove portions of said beam having wavelengths between said bands of wavelengths comprising said at least three primary color light beams;
   selectively modulating each of said at least three primary color light beams; and
   focusing said at least three selectively modulated primary color light beams onto an image plane.

9. The method of claim 1, said separating step further comprising using a color splitting prism assembly to separate said beam of light.

10. The method of claim 8, said separating step further comprising using a series of dichroic mirrors to separate said beam of light.

11. The method of claim 8, said separating step comprising the step of separating said beam of light into red, green, and blue primary color light beams.

12. The method of claim 8, said filtering step comprising removing at least some of the yellow and blue-green light from said beam of light.

13. A display system comprising:
   a light source for providing a beam of light along a white light path;
   a color splitter on said white light path for separating said beam of light into at least three primary color light beams, each of said at least three primary color light beams comprised of light in a band of wavelengths and traveling along a separate light path;
   three light modulators, each of said three light modulators disposed on one of said separate light paths for said three primary color light beams; and
   at least one color correction filter on said white light path, said color correction filter for removing a portion of light having a wavelength between said three bands of wavelengths, said at least one color correction filter angle-tuned to reduce the effect of manufacturing tolerances.

14. The display system of claim 13, wherein said color splitter is a color splitting prism assembly.

15. The display system of claim 13, wherein said color splitter is a series of dichroic mirrors.

16. The display system of claim 13, wherein said color splitter separates incident light into red, green, and blue primary color light beams.

17. The display system of claim 13, wherein said at least one color correction filter blocks yellow and blue-green light.

18. A display system comprising:
   a light source for providing a beam of light along a white light path;
   a color splitter on said white light path for separating said beam of light into at least three primary color light beams, each of said at least three primary color light beams comprised of light in a band of wavelengths and traveling along a separate light path;
   three light modulators, each of said three light modulators disposed on one of said separate light paths for said three primary color light beams; and
   at least one color correction filter on said white light path, said color correction filter for removing a portion of light having a wavelength between said three bands of wavelengths, said at least one color correction filter angle-tuned to alter the pass-band characteristics of the filter.

19. The display system of claim 18, wherein said color splitter is a color splitting prism assembly.

20. The display system of claim 18, wherein said color splitter is a series of dichroic mirrors.

21. The display system of claim 18, wherein said color splitter separates incident light into red, green, and blue primary color light beams.

22. The display system of claim 18, wherein said at least one color correction filter blocks yellow and blue-green light.

* * * * *